United States Patent [19]
Henderson

[11] Patent Number: 4,662,588
[45] Date of Patent: * May 5, 1987

[54] AIRPLANE CONFIGURED WITH A MOVEABLE DISK STRUCTURE

[76] Inventor: Charles Henderson, 8308 Cagle Rd., Oxon Hill, Md. 20744

[*] Notice: The portion of the term of this patent subsequent to Feb. 5, 2002 has been disclaimed.

[21] Appl. No.: 584,310

[22] Filed: Mar. 5, 1984

Related U.S. Application Data

[63] Continuation-in-part of Ser. No. 368,862, Apr. 15, 1982, abandoned.

[51] Int. Cl.$^4$ .............................................. B64C 1/36
[52] U.S. Cl. ................................. 244/118.2; 244/36; 343/708
[58] Field of Search ................. 244/36, 49, 13, 118.1, 244/118.2, 12.4, 12.5, 12.2, 23 C; 343/705, 708; D12/333, 334, 338, 341, 342

[56] References Cited

U.S. PATENT DOCUMENTS

| | | | |
|---|---|---|---|
| D. 167,258 | 7/1952 | Doi | D12/333 |
| D. 183,349 | 8/1958 | Johnson | 244/12.2 |
| 2,736,514 | 2/1956 | Ross | 244/23 C |
| 3,002,709 | 10/1961 | Cochran | 244/12.2 |
| 3,049,320 | 8/1962 | Fletcher | 244/12.4 |
| 3,066,890 | 12/1962 | Price | 244/12.2 |
| 3,656,164 | 4/1972 | Rempt | 343/705 |

*Primary Examiner*—Trygve M. Blix
*Assistant Examiner*—Rodney Corl

[57] ABSTRACT

A delta-wing and a tapered-wing planform are combined and result in an airplane which does not require a tail assembly or a fuselage and which provides a means to resolve the conflicting requirements for large circular aperture payload space and low drag, high endurance flight. The invention consists of a flying machine with a moveable disk structure which enables a suitable circular aperture phased array antenna system to be operated either within the wing envelope or in a vertical position so that multiple narrow pencil beams can be electronically steered in opposite directions from the airplane. The location of the antenna with respect to the wing structure is such that it can operate with a corporate-fed array in the horizontal position and/or a space-fed array in the vertical position.

6 Claims, 10 Drawing Figures

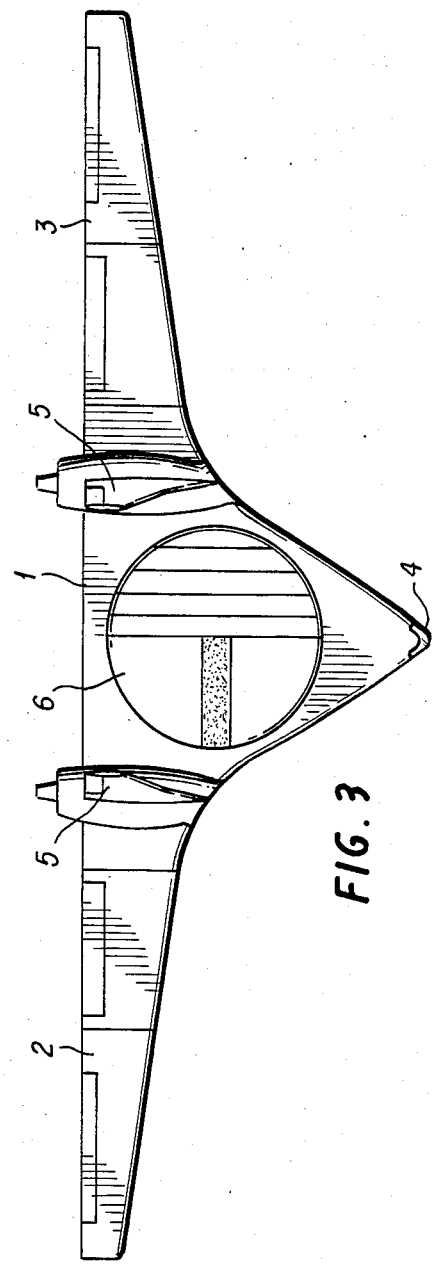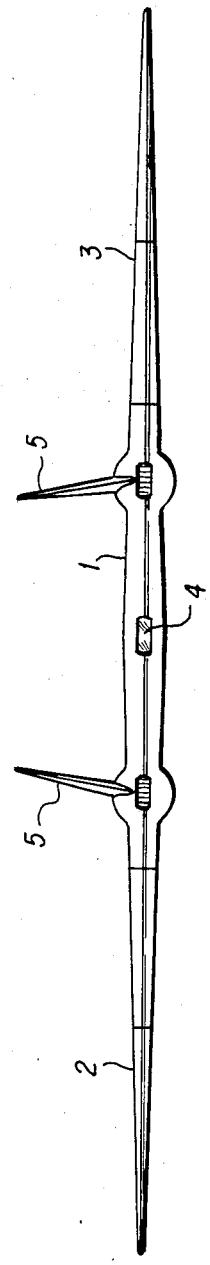

AIRPLANE CONFIGURED WITH A MOVEABLE DISK STRUCTURE

BACKGROUND OF THE INVENTION

This application is a continuation-in-part of application Ser. No. 368,862, filed Apr. 15, 1982, now abandoned.

The invention relates generally to high endurance airplanes used for communications, surveillance, command and control platforms. Specifically, the invention relates to a low drag airplane with a deployable circular aperture antenna.

SUMMARY

The aerodynamic efficiency of the flying wing is well known. Drag is reduced by eliminating the fuselage and tail and placing the crew, powerplant and payload in the wing envelope. The thickness of the wing can be reduced further by eliminating the crew and operating the airplane as an unmanned remotely piloted vehicle. In a very early design of a three-element wing by Jean F. G. M. L. Charpentier, which was described in U.S. Pat. No. 1,893,129, the outer elements provided most of the lift while the central element was configured to provide longitudinal static stability. The leading edges of the three elements were aligned so as to provide a continuous outline in a horizontal projection.

My invention takes greater advantage of the airplane shape by combining a delta-wing planform in the central section with a tapered-wing planform for the outer sections. The long, relatively narrow outer wing sections provide the airplane with a high endurance capability, while the central section provides space for a large disk structure. Stability of the airplane can be achieved by means other than the shape of the central section. Such means are well known.

The disk structure described in the present invention is primarily intended to house a flat, circular payload. The most likely payload would be a circular aperture antenna used for radar and communications purposes. Such an antenna provides multiple, narrow pencil beams which are centered on opposite sides of the circular aperture. With the antenna in the stowed position within the wing envelope, the direction of the radiated signal would be above and below the airplane. The beams are electronically steered; the antenna is stationary. By rotating the disk structure to a vertical position while in flight, the radiating energy from the antenna is then directed to the left and to the right of the flight path. Only the edge of the disk would be presented to the wind stream when ever it was rotated outside of the wing envelope.

The disk structure is not limited to house only microwave antennas. Instead, it could be comprised of an optical reflector or any other device designed to transmit, receive or reflect energy radiating from a circular aperture. Other classes of payloads are also applicable.

The novel aspects of the invention are its configuration and utility that results from an airplane which is comprised of a combined delta- and tapered-wing planform which provides high endurance and facilitates the use of a large disk structure that can either remain within the wing envelope or be raised during flight so that a circular aperture is presented to either side of the airplane while a narrow edge is presented to the wind stream. The invention permits a manned aircraft or an unmanned, remotely piloted vehicle, so configured, to orbit on station for long periods of time and to direct narrow pencil beams above and below or to either side of the airplane. The two-sided circular aperture, when comprised of a suitable antenna and processing equipment, permits airborne point-to-point communication relay operations, radar operations, command and control signal transmission and reception and combined operations to be carried out with highly directional beams.

BRIEF DESCRIPTION OF THE DRAWINGS

FIG. 3 is a top plan view of the airplane with the antenna stowed.

FIG. 4 is a front elevation view of the airplane with the antenna stowed.

BRIEF DESCRIPTION OF THE PREFERRED EMBODIMENT

Most of the existing airplanes used for communications, surveillance, command and control require large airframe structures comprised of fuselage and tail assemblies. Such structures do not permit the use of a circular aperture antenna larger than the diameter of the fuselage. Furthermore, the size of the fuselage cannot be increased without increasing drag and increasing the radar cross section of the airplane. A pure flying wing airplane would eliminate the fuselage and offer greater aerodynamic efficiency. However, the wing area would have to be enlarged considerably to house a circular aperture antenna.

It is well known that flight endurance is a function of aspect ratio (i.e., the ratio between the square of the span, b, and the surface area S A.R.$=b^2/S$). Hence, the span of a pure flying wing would have to be exceedingly large to counteract the larger area required by the circular aperture.

Figure 1:
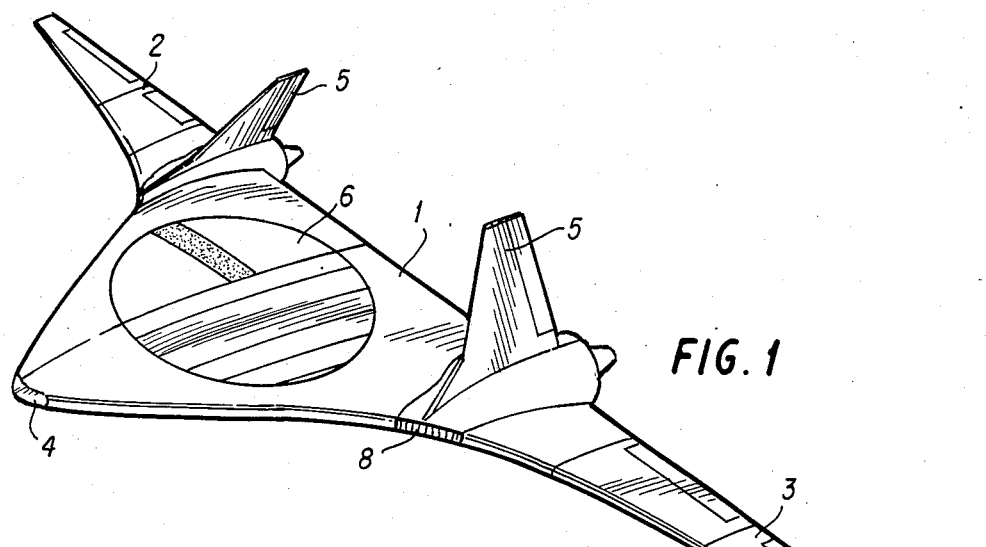
FIG. 1 is a three-quarter perspective view from above of an airplane in flight, showing the antenna stowed.
Figure 2:
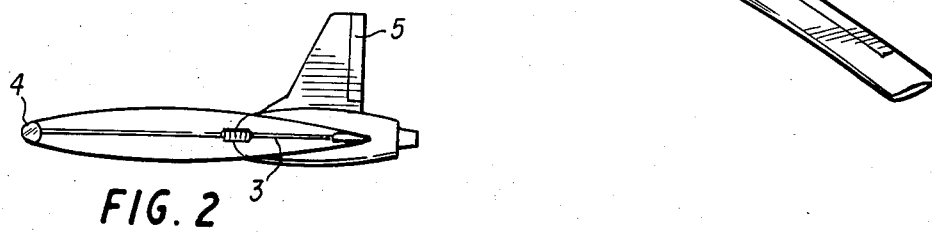
FIG. 2 is a side elevation view of the airplane shown in FIG. 1.

According to my invention shown in FIG. 1, the disadvantages of the other airplane structures are overcome by using a combined delta-wing planform and a tapered-wing planform. The delta-shaped center section 1 contains the navigation equipment, tricycle landing gear, communications and radar equipment, hydraulics, fuel control system, and the moveable disk structure which houses the circular aperture antenna. In the tapered outer wing sections 2,3 are the fuel cells, flaps and elevons. The twin rudder assemblies are mounted over the powerplants which are imbedded in the wing at the transition between the central and outer sections. The rudder assemblies are canted inward to reduce radar cross section back-scatter from the side aspect. FIG. 2 shows the otherwise low profile of the unmanned airplane when viewed from that aspect. The optical window 4 contains a television camera as a landing aid.

FIG. 3 shows the rudder assemblies mounted somewhat to the rear of the antenna aperture in order to reduce blockage by the metal portions of the assembly 5. The moveable disk 6 is shown in the horizontal or stowed position. A stationary wind curtain 7 covers one-half of the disk on opposite sides of the top and bottom. The thin curtain is constructed of flexible material transparent to antenna's microwave frequency band.

The circular aperture antenna contained within the disk is covered by a radome whose shape conforms with the shape of the central section when the antenna is in the horizontal position. FIG. 4 shows the low profile in the forward aspect and illustrates how the stowed antenna is completely contained within the wing envelope. The antenna has no blockage whatsoever for beam directions below the airplane.

When the antenna is operated in the horizontal position, a suitable corporate-fed phased array would be required. By placing separate antenna elements on both sides of the antenna, narrow pencil beams can be steered in directions above and below the airplane either simultaneously or on a time-shared basis. This permits vehicle communication links between the airplane and satellites above and ground terminals below. It also permits radar targets within the field of view to be tracked above and below the airplane.

Figure 5:
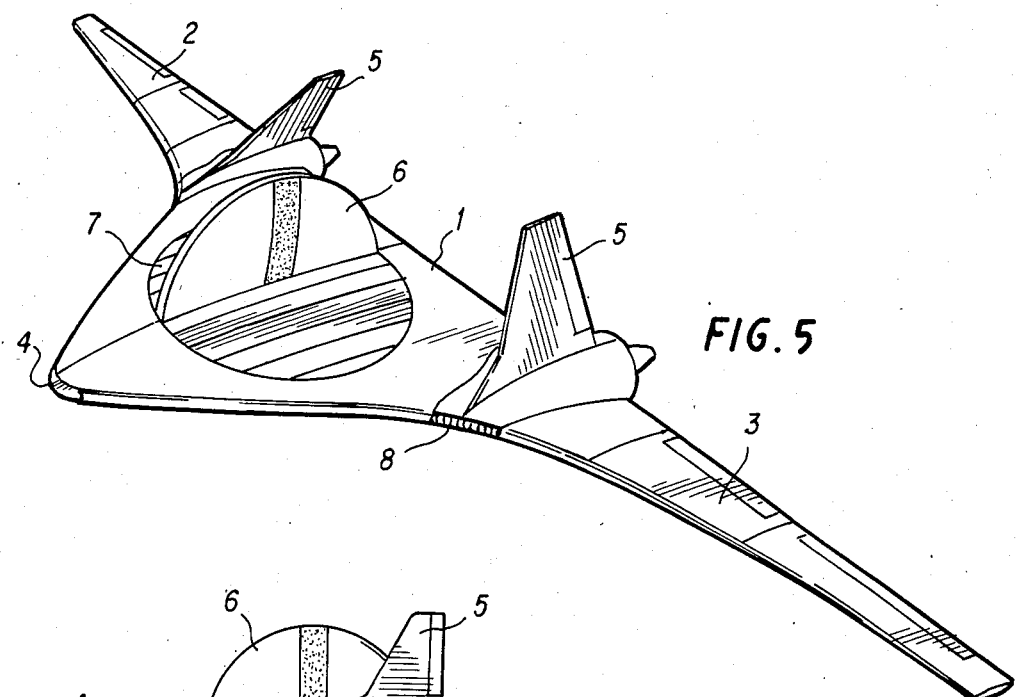
FIG. 5 is a three-quarter perspective view from above of an airplane in flight, showing the antenna tilted vertically.

FIG. 5 shows the moveable disk 6 rotated into the vertical position. This allows pencil beams to be directed to either side of the airplane. As the disk is rotated into position, a curtain 7 is raised on each side to cover the openings left by the disk. The curtains can either be raised mechanically or they can be made of a stretchable material that will spring up after being pressed flat by the disk in the stowed position. In the raised position the edge of the curtain next to the disk will deform to its shape and positive air pressure between the top and bottom curtain will maintain their curvature to conform to the outline of the wing surface.

FIG. 5 also shows how the antenna in the vertical position can be operated as a space-fed antenna with the separate feeds A,B located at the focii for a back-to-back parabola configuration. In this case the separate feed points are located in front of each respective antenna. On the other hand, if the disk is configured with back-to-back lens antennas, then the feed points A,B will be located behind their respective antennas. The versatility of these arrangements are entirely novel. The location of the feed with respect to the antenna yeilds a focal length, f, to diameter, D, ratio of $f/D = \frac{1}{2}$.

Figure 6:
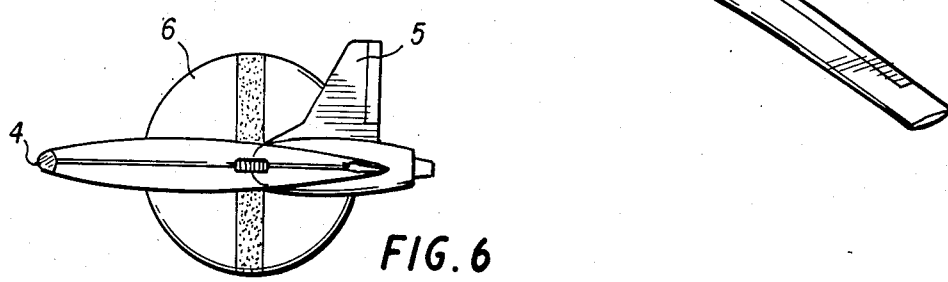
FIG. 6 is a side elevation view of the airplane with the antenna tilted vertically.

FIG. 6 shows the side elevation view of the airplane with the disk rotated to the vertical position. A slight blockage will be caused by the wing and the rudder assembly. However, by constructing the rudder assembly out of composite material such as fiber glass and foam which is relatively transparent to microwave frequencies and by using only a single spar for structural strength, then the blockage can be minimized.

The antenna comprised of a phased array and a suitable feed configuration can remain stationary while the beams are steered electrically. The state-of-the-art is such that active antenna elements comprised of microcircuits can be used on the array, thus permitting highly steerable multiple beams with an antenna that is relatively light in weight and very reliable. The latter characteristic results from the gradual degradation in performance which is tolerable when a few elements fail as opposed to the catastrophic failure of a single high power transmitter. Again, this technology is not new. However, it serves to illustrate how such a suitable antenna can be incorporated in the moveable disk without undue weight or power penalties.

Figure 7:
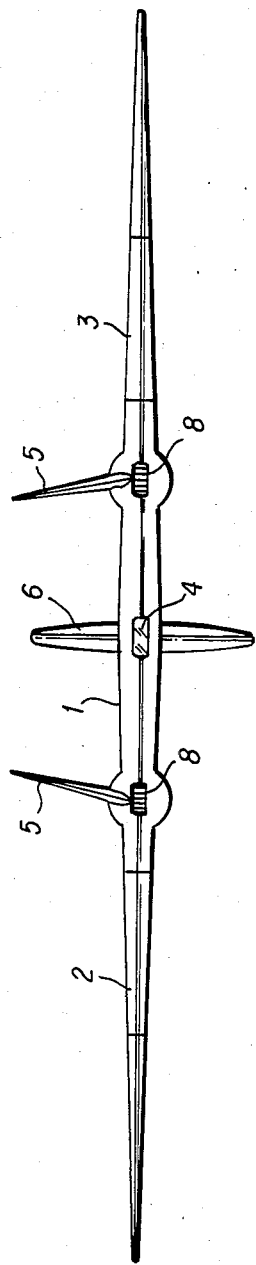
FIG. 7 is a front elevation view of the airplane with the antenna tilted vertically.

In FIG. 7 a front elevation view of the airplane is shown with the disk 6 rotated into the vertical position. Rotation can be accomplished by hydraulic means with the rotation rate being similar to the rate for extending the landing gear. Any asymmetric aerodynamic effects encountered during the rotation can be compensated for by means of the wing control systems. The drag produced by the disk will be less than that produced by a lowered landing gear because of the streamline shape of the disk. Only the edge of the disk will be presented to the wind stream. The disk is returned to the horizontal position before the landing gear is lowered.

FIG. 7 also shows that the powerplant inlets 8 are contained in the leading edge of the wing. In this position they present a relatively low radar cross section in the forward aspect. The airplane is primarily intended to orbit at high altitudes at low subsonic speeds in order to conserve fuel and to extend its range and endurance. However, it should be understood that the inlets can be modified if after wind tunnel tests such modifications are deemed to be appropriate.

Figure 8:
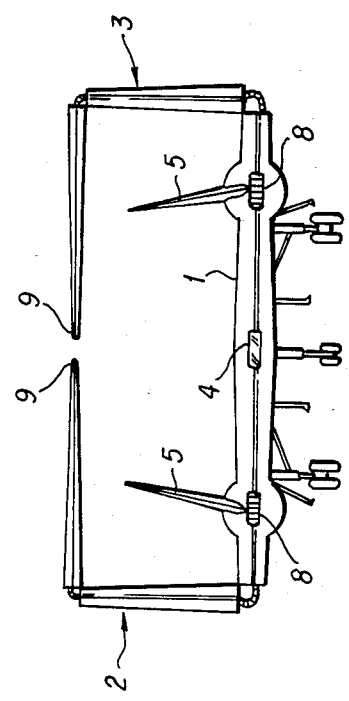
FIG. 8 is a front elevation view of the airplane on the ground with the wings folded and the antenna stowed.

In FIG. 8 the airplane is shown on the ground with the wings folded. The wings can be constructed of a composite material that has a lighter weight but a greater stiffness than aluminum. Wing folding can be accomplished by using cantilever wing sections and spring loading the joints. Then, bidirectional winch control can be used to fold and unfold the wings in synchronism. By placing large bumpers 9 on the wing tips and keeping the bumpers in compression, the outer wing sections will remain in the position shown when the fuel cells are empty. Alternatively, a hard point on top of a reenforced rudder assembly would allow the outer wing section to rest on that assembly. With the wings folded in two places, the airplane would occupy a volume that is approximately one-half that of a high performance fighter plane.

The airplane described herein can be readily maintained on the ground by removing the radome and the wind curtains and replacing any failed antenna elements or other electronic equipment. In addition, the entire disk can be removed and replaced with a different payload. That is, the disk does not have to be limited to an antenna configuration, nor does it have to be rotated vertically. It can be configured for aerial mapping equipment, electronic countermeasures equipment, air-dropped buoys and small downward ejected weapons. A disk comprised of a vertical-thrust powerplant instead of a payload would allow vertical takeoff and landing (VTOL) operations. There are obviously many other variations that can be configured with the replaceable disk structure. No attempt is made here to list them all.

An aircraft designed with the removeable disk housing structure configured for a rotatable antenna is the preferred embodiment of this invention. The circular, disk-shaped antenna housing is symmetric, hence the delta-wing airfoil must also by symmetric so that the antenna housing can be completely contained within the wing envelope. By imbedding the aircraft powerplants in the wing at the transition points between the delta-wing and tapered-wing sections as shown in FIG. 3, it is possible for the tapered-wing to have a different airfoil such as a cambered one. The location of the powerplants as well as their associated vertical stabilizers also serves as a means for separating the disturbed airflow, which results when the antenna housing is rotated, from the airflow which produces lift on the tapered-wings.

Figure 9:
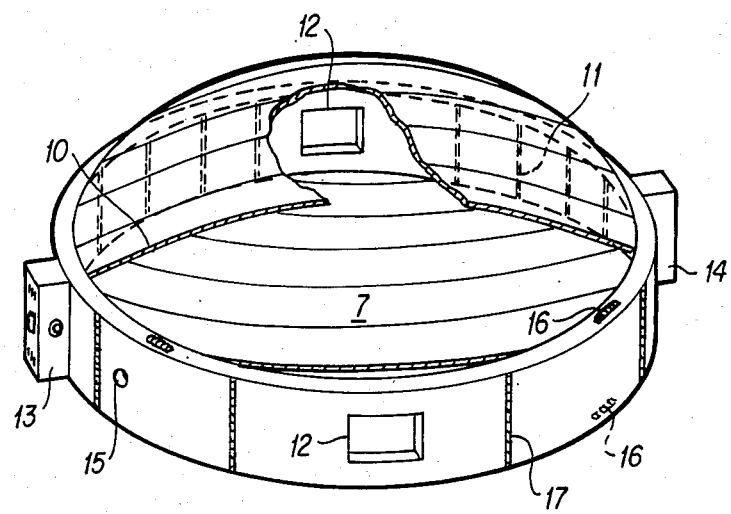
FIG. 9 is a perspective view from above of the removeable disk housing configured for a circular aperture antenna with the antenna and radome removed for clarity.

FIG. 9 shows the removeable disk structure configured for a rotatable antenna with the antenna and housing removed for purposes of clarity. The curtains which cover the opening when the antenna is rotated to the vertical position are made of a suitable material such as fiberglass which is transparent to microwave radiation. The fixed curtains, 10, are in diagonally opposite positions and the moveable curtains, 7, are opposite each fixed one. The curtains are moved by spring-action, 11, once the antenna housing begins to rotate. Several curtain panels close to the center of the structure are made with elastic content so that they can slide together and deform to the shape of the antenna housing in its vertically rotated position. The window openings in the side of the disk structure, 12, permit the antenna, so rotated, to be space-fed from two feed points which are lateral to and equidistant from the centerline of the aircraft.

The two rectangular-shaped appendages on either end of the disk structure shown in FIG. 9 are used to align the disk when it is installed in the cavity in the delta-wing section. The larger of the two, 13, houses suitable umbilical connectors, right-angle drive gears and shaft bearings, while the other, 14, houses shaft bearings. The disk is held in the aircraft by means of suitable retractable locking pins and receptacles, 15. The pins are mounted so that they retract into the wing. When the disk is removed from the aircraft, it is supported at hard points, 16, on the bottom and then permitted to slide down from the cavity on suitable ball bushing bearings, 17, to a conventional ground support vehicle used for installing, removing and transporting the disk.

Figure 10:
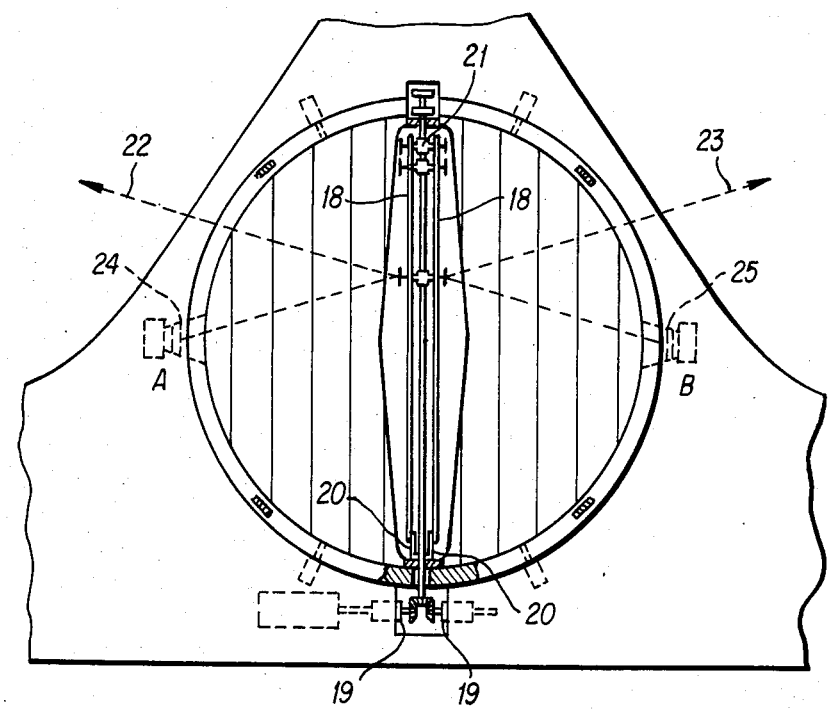
FIG. 10 is a top plan view of the central wing section, including a cross sectional view through the antenna housing along the mounting shaft.

FIG. 10 shows the back-to-back circular aperture phased array antennas, 18, rotated to the vertical position. Rotation is accomplished by suitable means through a right-angle drive mechanism which is clutch-disengageable at the interface, 19, between the disk structure and the wing. Suitable means are provided for mounting the circular arrays inside the radome housing, 20, and attaching the housing to the drive shaft so that the entire system moves as a unit. Following the 90-degree rotation, the antenna system is locked in place by suitable means.

In a preferred embodiment of the invention, a suitable arrangement of back-to-back antenna elements are interconnected through suitable phase shifter modules, 21, as shown in FIG. 10. This permits the antenna beams, shown typically by single rays, 22 and 23, to be alternately produced from suitable feeds A, 24, and B, 25, and then independently steered electronically in a space-fed lens configuration. Many other antenna configurations are possible. By electronically disconnecting the link between antennas at the phase shifter modules, each antenna can then be operated as a reflector rather than a lens, thereby permitting simultaneous operation of the two sides in a space-fed parabola configuration.

This same configuration can be used with a suitable reflector and phased array at the feed to produce a fixed beam, variable beamwidth antenna system for ground mapping applications.

The above description and appended drawings show by way of example the preferred embodiment of the invention, but it should be understood that any aircraft manned or unmanned to which the above features are applied falls within the scope of the invention which is by no means limited to the types shown and described.

What is claimed and desired to be secured by Letters Patent of the United States is:

1. In an aircraft comprised of a wing whose central wing section encompassing the aircraft's longitudinal centerline is not obstructed by a fuselage, a large replaceable disk structure mounted in a circular cavity which is vertically orientated and extends completely through said wing section; an inner, structure-mounted moveable disk-shaped radome housing which contains a circular aperture antenna system, said housing being rotatable from a position inside the wing envelope to a vertical position outside, with only the radome's edge being presented to the wind stream, thereby permitting said antenna system to direct beams to both sides of the flight path, with a minimum of obstruction in either direction.

2. In an aircraft comprised of a wing whose central wing section encompassing the aircraft's longitudinal centerline is not obstructed by a fuselage, a large replaceable disk structure mounted in a circular cavity which is vertically orientated and extends completely through said wing section; an inner, structure-mounted moveable disk-shaped radome housing which contains a circular aperture antenna system, said housing being rotatable from a position inside the wing envelope to a vertical position outside, with only the radome's edge being presented to the wind stream, thereby permitting said antenna system comprised of suitable back-to-back antennas to be operated in a space-fed reflector configuration, with the feed points transversely located in the wing so that the beams emanating from each antenna are directed, with a minimum of obstruction, to the same side as their respective feed.

3. In an aircraft comprised of a wing whose central wing section encompassing the aircraft's longitudinal centerline is not obstructed by a fuselage, a large replaceable disk structure mounted in a circular cavity which is vertically orientated and extends completely through said wing section; an inner, structure-mounted moveable disk-shaped radome housing which contains a circular aperture antenna system, said housing being rotatable from a position inside the wing envelope to a vertical position outside, with only the radome's edge being presented to the wind stream, thereby permitting said antenna system comprised of suitable back-to-back antennas to be operated in a space-fed lens configuration, with the feed points transversely located in the wing so that the beams emanating form each antenna are alternately directed, with a minimum of obstruction, to the side opposite their respective feed.

4. An aircraft comprising: a delta-wing central section which is unobstructed by a fuselage on the aircraft longitudinal centerline; a pair of tapered outer wing sections, each tapered section extending outwardly from said central section; a pair of powerplants, each laterally disposed and imbedded in the wing at the transition between the steeply sloping leading edge of said delta-wing section and the gradually sloping leading edge of said tapered wing section; a large circular cavity, vertically orientated and extending completely through said delta-wing section; a moveable inner disk structure which fills said cavity, forms a substantially continuous surface with said delta-wing section and is rotatable about the aircraft longitudinal axis between a horizontal position within the wing envelope and a vertical position outside the envelope; and said disk structure, being rotated vertically, is positioned so that the narrow edge of said disk structure faces the wind stream.

5. In an aircraft of the type comprised of a central wing section without a fuselage on the aircraft longitudinal centerline, a large circular cavity, vertically orientated and extending completely through said wing section; a releasably mounted disk structure which fills said cavity, forms a substantially continuous surface with said wing section and which is removable on the ground such that said disk structure is readily replaced by a different disk structure; and said disk structure, being mounted substantially within the wing envelope, provides a reduced aircraft drag profile and, concurrently, is provided with unobstructed access to the external environment above and below the aircraft.

6. In an aircraft of the type comprised of a central wing section without a fuselage on the aircraft longitudinal centerline, a large circular cavity, vertically orientated and extending completely through said wing section; a disk structure mounted in said cavity so as to form a substantially continuous surface with said wing section; and said disk structure, being comprised of a large circular aperture antenna housing, is positioned horizontally so as to remain within the wing envelope and so that the circular aperture sides of said antenna housing face outwardly, above and below the aircraft.

* * * * *